United States Patent
Heckmann et al.

(10) Patent No.: US 10,940,864 B2
(45) Date of Patent: Mar. 9, 2021

(54) SYSTEM FOR AUTONOMOUSLY OR PARTIALLY AUTONOMOUSLY DRIVING A VEHICLE WITH COMMUNICATION MODULE FOR OBTAINING ADDITIONAL INFORMATION FROM A VEHICLE DRIVER AND CORRESPONDING METHOD

(71) Applicant: HONDA RESEARCH INSTITUTE EUROPE GMBH, Offenbach/Main (DE)

(72) Inventors: Martin Heckmann, Offenbach (DE); Heiko Wersing, Offenbach (DE)

(73) Assignee: HONDA RESEARCH INSTITUTE EUROPE GMBH, Offenbach Main (DE)

( * ) Notice: Subject to any disclaimer, the term of this patent is extended or adjusted under 35 U.S.C. 154(b) by 73 days.

(21) Appl. No.: 15/233,437

(22) Filed: Aug. 10, 2016

(65) Prior Publication Data

US 2017/0050642 A1    Feb. 23, 2017

(30) Foreign Application Priority Data

Aug. 17, 2015 (EP) .................................... 15181270
Jan. 13, 2016 (EP) .................................... 16151130

(51) Int. Cl.
*B60W 40/04* (2006.01)
*B60W 50/08* (2020.01)
(Continued)

(52) U.S. Cl.
CPC ............ *B60W 40/04* (2013.01); *B60W 40/09* (2013.01); *B60W 50/08* (2013.01); *B60W 50/10* (2013.01);
(Continued)

(58) Field of Classification Search
CPC ...... B60W 40/04; B60W 40/09; B60W 50/08; B60W 50/10; B60W 30/12; B60W 50/023;
(Continued)

(56) References Cited

U.S. PATENT DOCUMENTS

| 8,224,029 B2* | 7/2012 | Saptharishi | ...... H04N 5/232933 |
| | | | 382/103 |
| 8,660,734 B2* | 2/2014 | Zhu | .......................... B60R 1/00 |
| | | | 701/23 |

(Continued)

OTHER PUBLICATIONS

European Search Report application No. 16151130.8 dated Jan. 16, 2017.

*Primary Examiner* — Hunter B Lonsberry
*Assistant Examiner* — Luis A Martinez Borrero
(74) *Attorney, Agent, or Firm* — Squire Patton Boggs (US) LLP (57) ABSTRACT

Control commands in a system and method for autonomously driving a vehicle or partially autonomously driving a vehicle are generated on the basis of an environment representation, which is generated from sensor signal of a sensing means. The environment representation where ambiguous objects are identified is such that information obtained from the driver of the vehicle are added. The system generates an information request. Additional information is extracted and accumulated in the environment representation map. Traffic is then determined and suitable control signals for the vehicles are generated. In case no ambiguous objects are included in the environment representation but the system is not capable of deciding on traffic, the driver is asked to disambiguate the situation or to instruct on dealing with the traffic.

10 Claims, 4 Drawing Sheets

(51) Int. Cl.
*G05G 1/01* (2008.04)
*B60W 40/09* (2012.01)
*B60W 50/14* (2020.01)
*B60W 50/10* (2012.01)
*G08G 1/01* (2006.01)

(52) U.S. Cl.
CPC ........... *B60W 50/14* (2013.01); *G08G 1/0104* (2013.01); *B60W 2420/00* (2013.01); *B60W 2540/215* (2020.02); *B60W 2540/22* (2013.01); *B60W 2554/00* (2020.02); *B60W 2556/00* (2020.02)

(58) Field of Classification Search
CPC ..... B60W 10/18; G08G 1/0104; G08G 1/005; G08G 1/166; G08G 1/16; G08G 1/04
See application file for complete search history.

(56) References Cited

U.S. PATENT DOCUMENTS

| | | | |
|---|---|---|---|
| 8,761,991 B1 | 6/2014 | Ferguson et al. | |
| 8,983,679 B2 * | 3/2015 | Kitahama | G08G 1/166 701/1 |
| 9,104,965 B2 * | 8/2015 | Fritsch | B60W 30/095 |
| 9,632,502 B1 * | 4/2017 | Levinson | G01S 17/87 |
| 9,829,575 B2 * | 11/2017 | Hegemann | G01S 7/003 |
| 10,048,683 B2 * | 8/2018 | Levinson | G05D 1/0027 |
| 2008/0288140 A1 * | 11/2008 | Matsuno | B60T 8/17551 701/41 |
| 2009/0051516 A1 * | 2/2009 | Abel | B60W 50/14 340/436 |
| 2009/0125203 A1 * | 5/2009 | Lindqvist | G08G 1/166 701/96 |
| 2012/0022716 A1 * | 1/2012 | Kitahama | G08G 1/166 701/1 |
| 2012/0083960 A1 * | 4/2012 | Zhu | G05D 1/0276 701/23 |
| 2013/0179382 A1 * | 7/2013 | Fritsch | B60W 50/14 706/46 |
| 2014/0244096 A1 | 8/2014 | An et al. | |
| 2014/0249722 A1 | 9/2014 | Hegemann et al. | |
| 2017/0123419 A1 * | 5/2017 | Levinson | G05D 1/0022 |
| 2018/0136644 A1 * | 5/2018 | Levinson | G05D 1/0027 |

\* cited by examiner

SYSTEM FOR AUTONOMOUSLY OR PARTIALLY AUTONOMOUSLY DRIVING A VEHICLE WITH COMMUNICATION MODULE FOR OBTAINING ADDITIONAL INFORMATION FROM A VEHICLE DRIVER AND CORRESPONDING METHOD

BACKGROUND

Field

The invention regards a system for autonomous driving or partially autonomous driving a vehicle with communication module for obtaining additional information from a vehicle driver and a method for performing such autonomous driving or partially autonomous driving.

Description of the Related Art

Driving a vehicle has always been a challenging task for a driver. In particular over the last years, because traffic became more dense, often a lack of concentration or a wrong estimation of a traffic situation by the driver were the reason for accidents. Thus, systems have been developed that assist the driver in driving. The systems have not only been developed in order to increase the comfort for the driver but also to improve safety. In many cases nevertheless the systems only observe the environment of the vehicle and in case that an uncertain situation occurs the driver is informed by the system and his attention is drawn to a part or object of the scene that he might have overseen otherwise. More recent developments are capable of autonomously driving a vehicle or at least partially autonomously driving a vehicle. Many of these systems generate an environment representation and based on such environment representation the situation that is encountered by the vehicle is determined and the controls of the car like steering, throttle or brakes are actuated. In order to establish such an environment representation the vehicle is equipped with sensors and other data that is also available for the system might be included in the representation. The representation is for example a 2D-map in which occupied areas, road edges and the like are stored. In addition to this information also further features of the grid cells of such 2D-map may be added. For example an object that is illustrated as an occupied cell may convey further information like a direction of movement that is expected.

A problem of all these already known systems that rely on an environment representation which can also be a 3D representation of course or any other suitable structure that is capable of representing objects and other information on the environment of the vehicle, is that the information that is included in such environment representation is necessarily limited. The limitation is a consequence of the fact that the information is derived on the basis of sensors that physically sense the environment of the vehicle and on data which is received for example by car to car communication from other cars directly transmitting information to the vehicle. Thus, if there might be a perception by the sensors of the vehicle that does not unambiguously allow to derive an intention for example of a person standing at the pavement the system cannot decide with sufficient reliability on an action that needs to be taken. For example the system cannot determine if a person standing at the pavement at the edge and looking to the other side of the road will cross the road or not. It is impossible for an autonomously driving system to decide whether to decelerate or pass the person at constant speed.

Contrary to a human driver who in such cases usually tries to have an eye contact with such person the capability of the known systems for obtaining information from the environment are pretty limited. As a consequence the performance of such autonomous driving systems is also limited.

On the other side, it is known to use interactive control systems that comprise communication modules in order to receive instructions from a driver of a car. But these instructions are never directed to clarification of a traffic situation or enhancing the basis for an autonomous drive system in order to get proper control results.

SUMMARY

Thus, it is an object of the present invention to improve the performance of autonomous driving systems or partially autonomous driving systems and the methods realizing such autonomous or partially autonomous driving. The object is achieved by the present invention according to the independent claims.

The system according to the invention for autonomously or partially autonomously driving comprises at least one sensing means for physically sensing an environment of the vehicle. Such sensing means can be for example a camera, stereo camera, flight of time camera, radar sensor, LIDAR sensor, ultrasonic sensor or the like. On the basis of the output of such sensing means, a representation of the environment is generated by accumulating information on objects in the environment. The representation is generated by a representation generation means and includes at least information on objects like other traffic participants, infrastructure elements or the like that are necessary to evaluate a traffic situation in respect of an intended driving in line with a given drive task like for example driving to a predetermined target. According to the invention, the system further comprises a communication module. With such communication module, additional information can be obtained from a driver of the vehicle. The communication between the system and the driver is according to one embodiment of the present invention used to add information which is included in the environment representation. By adding such information it is in particular possible to obtain information from the driver for such objects that are sensed by the sensing means, but for which no information can be derived from the output of the sensing means or at least information with only a limited confidence which is below a predetermined threshold. If it is for example important to know the current status of traffic lights, but due to bad weather conditions or difficult light conditions, it is not possible for the system to automatically decide whether red, yellow or green light is on, a communication with the driver can be started and the driver can then input via the communication module that currently the traffic light shows a red light for example. This additional information is then added to the representation and thus, the basis for the further calculation of control commands for driving the vehicle autonomously is improved. Thus, on the basis of such enhanced environment representation an evaluation is performed by an evaluation means. In such evaluation from the representation a current traffic situation is determined and control signals according to the control task that needs to be achieved are generated. On the basis of these control signals then controls of the vehicle like steering, throttle or brakes are actuated.

Sometimes and in other situations, it might be the case that although the information that is derived from the output of the sensing means is unambiguous and thus no further input regarding the objects detected by the sensing means is necessary. Nevertheless, the traffic situation might be of such nature that autonomously deciding on how to proceed with driving the vehicle is not possible by the system. Previously known systems in such case quit to execute the autonomous driving and pass the controls to the vehicle's driver. According to the invention in such case where the system on its own cannot decide how to proceed with driving the vehicle, again by use of the communication module a communication with the driver is started in order to obtain additional information and/or instructions on how to proceed with driving. Thus, the duty of controlling all the actuators of the vehicle is not completely passed to the driver, but only an information is retrieved how the driving task shall be realized. On the basis of such information then the autonomously or partially autonomously driving system executes the driving task.

In the sub-claims there are defined advantageous aspects of the present invention.

It is for example advantageous to estimate a driver's state. By estimating the driver's state it is possible to adapt the way of communicating with the driver to the current state of the driver and thus make the communication more efficient and avoid ambiguities.

Furthermore, it is an advantage when the communication means is configured to adapt a communication with the driver on the basis of the driver's state.

For adapting the communication with the driver, the communication means comprises a driver information request generator preferably. In such driver information request generator it is then possible to generate an information request adapted to at least driver intention or a driver situation awareness or a driver system control model. Of course a combination of driver intention, driver awareness and/or driver system control model is also possible. To achieve this, the driver information request generator comprises respective estimation means. On the basis of the result of such estimation the request is adapted to meet the requirements for communication with the driver. Thus, in case that for example a high awareness of the situation on the driver's side can be recognized, the driver needs less information in order to correctly interpret a request from the system. If a low awareness of the driver may be recognized or estimated by the corresponding estimation means on the other side it is possible to enhance the request by adding more information in order to avoid a misunderstanding on the driver's side.

Furthermore it is particularly advantageous that the communication module is configured to request the driver to communicate with another traffic participant. In that case the capability of a human driver to directly communicate with another traffic participant such as a cyclist or a pedestrian may deliver additional information, which is then put into the system by the communication of the driver with the inventive system. This allows to significantly increase the capability of the system to make a more correct determination of the traffic situation. The system thus gains access to parts of information, which otherwise would be unavailable.

Furthermore it is advantageous to use speech output and/or speech input for communication with the driver or alternatively or additionally a head up display. Such ways of communication are especially suitable to provide communication capability between the car and the driver without distracting the concentration of the driver.

BRIEF DESCRIPTION OF THE DRAWINGS

The invention will be described in the following in detail in particular with reference to the annexed drawings in which.

DETAILED DESCRIPTION

Figure 1:
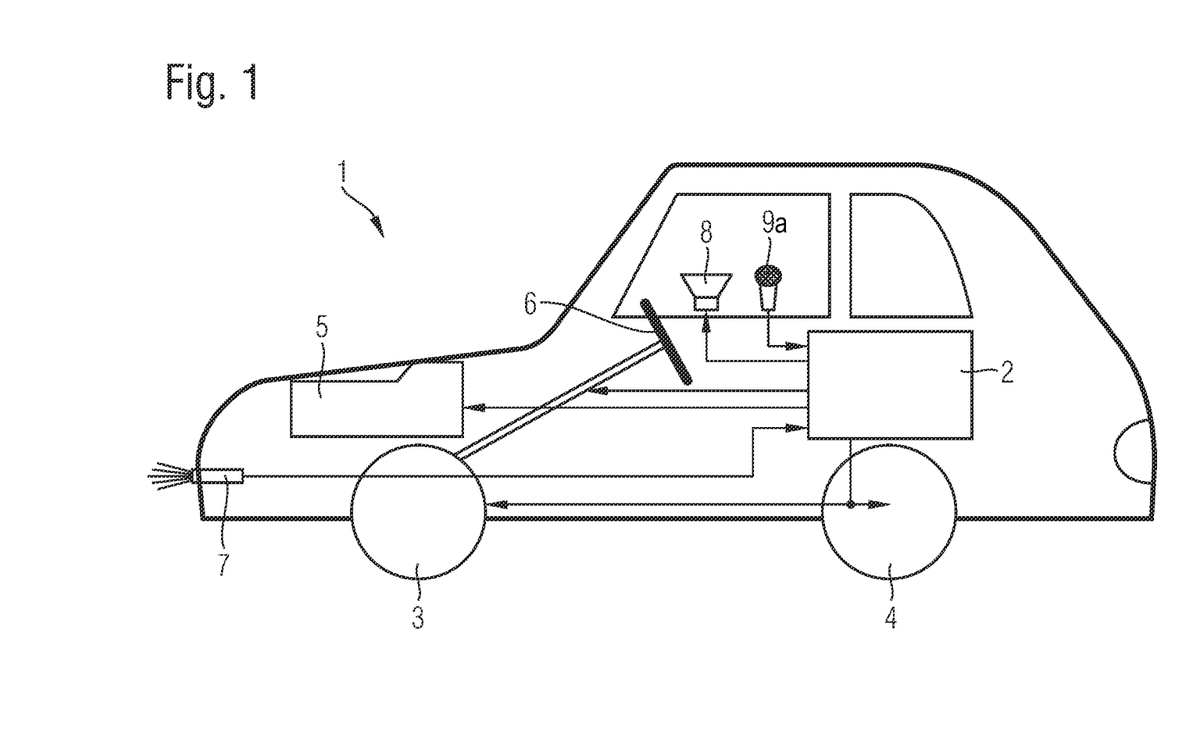
FIG. 1 shows a schematic of a vehicle comprising the inventive system for autonomously or partially autonomously driving the vehicle.

In FIG. 1 there is shown the basic configuration of the vehicle 1 that is capable of the autonomously or partially autonomously driving according to the present invention. The vehicle 1 comprises a central processing unit 2 responsible for evaluation, and processing of information that is input to the central processing unit 2 and for generating control commands in order to autonomously drive vehicle 1. The autonomous vehicle 1 in the illustrated embodiment is a car with steerable front wheels 3 and driven rear wheels 4. Of course the inventive system is also applicable to any kind of vehicle and thus is not limited to the car as shown in FIG. 1.

The autonomous vehicle 1 is driven by an engine 5 which is connected to the rear wheels 4 and generates a driving force. The direction of the vehicle 1 is controlled by a steering system including a steering wheel 6.

In order to execute the autonomous driving function or at least parts of autonomous driving, since fully autonomous driving is not necessary for the present invention, the vehicle 1 is equipped with a sensing means 7. The sensing means 7 may be for example a radar sensor, a LIDAR sensor, a camera, a stereo camera or the like and part of a ADAS (adaptive driver assistance system). It is to be noted that of course the sensing means 7 may include a plurality of either of the different sensors or even a combination of different sensors. The sensing means 7 is connected to a central processing unit 2 and thus transmits a signal corresponding to the perception of the environment of the vehicle to the central processing unit 2. In the drawing only a sensing means 7 at the front of the vehicle 1 is shown but it is evident that such sensing means 7 may be arranged in a distributed manner all over the vehicle 1 so that the complete surrounding and environment of the vehicle 1 may be perceived.

For communicating with the driver of the vehicle communication means are provided in the vehicle 1. The communication means are illustrated in the present embodiment as being formed by a speaker 8 and a microphone 9a. The speaker 8 and the microphone 9a together form the communication means that is capable to output information to the driver or generate the request which is output via the speaker 8 and to receive information from the driver via microphone 9a. The system includes also a speech recognition system which per se is known in the art so that from a spoken information that is received by microphone 9a the content of the spoken information is recognizable by the central processing unit 2.

In the illustrated embodiment the vehicle 1 comprises a communication means which is only formed by speaker 8 and microphone 9a but of course other input/output devices may also be used. In particular for outputting a request to the driver it is possible to use head up display, a display of a navigation system, a tactile device or the like. As further input devices for example a camera for gesture input, a touchscreen or the like might be used. By means of the camera it is for example possible to simply recognize a nodding movement of the head for an answer like "yes" or shaking the head for "no". This is in particular suitable if the question that was generated by the system allows a simple answer like yes or no. Using a touch screen is for example efficient in case that only a limited number of possible answers to a question are possible.

As it will be described later on in detail the central processing unit on the basis of the information that is received from the sensing means 7 and additionally via the communication means will generate control commands or control signals in order to autonomously or at least partially autonomously drive the vehicle 1. It is to be noted that also subtasks of the autonomous driving are considered as partially autonomously driving in the sense of the present invention. For example the system could be instructed to execute only an observation of a particular area like for example a road intersection or a part thereof which is essential for the driving of the vehicle but the actuation of car components like engine, brakes or steering remains with the driver.

When control signals are generated by the central processing unit 2 these control signals are transmitted to for example engine 5, steering system or steering wheel 6 and brake system (not illustrated in the drawing) as indicated by the respective arrows in FIG. 1. In case that no direct interaction with engine 5, brake or steering 6 of the car is needed in order to fulfill the respective task like observation of a intersection area or the like the output of the control signal corresponds to the signal which is the basis for outputting for example a spoken information, for displaying on a navigation system and information for the driver or a signal used for displaying the information in the head up display.

Figure 2:
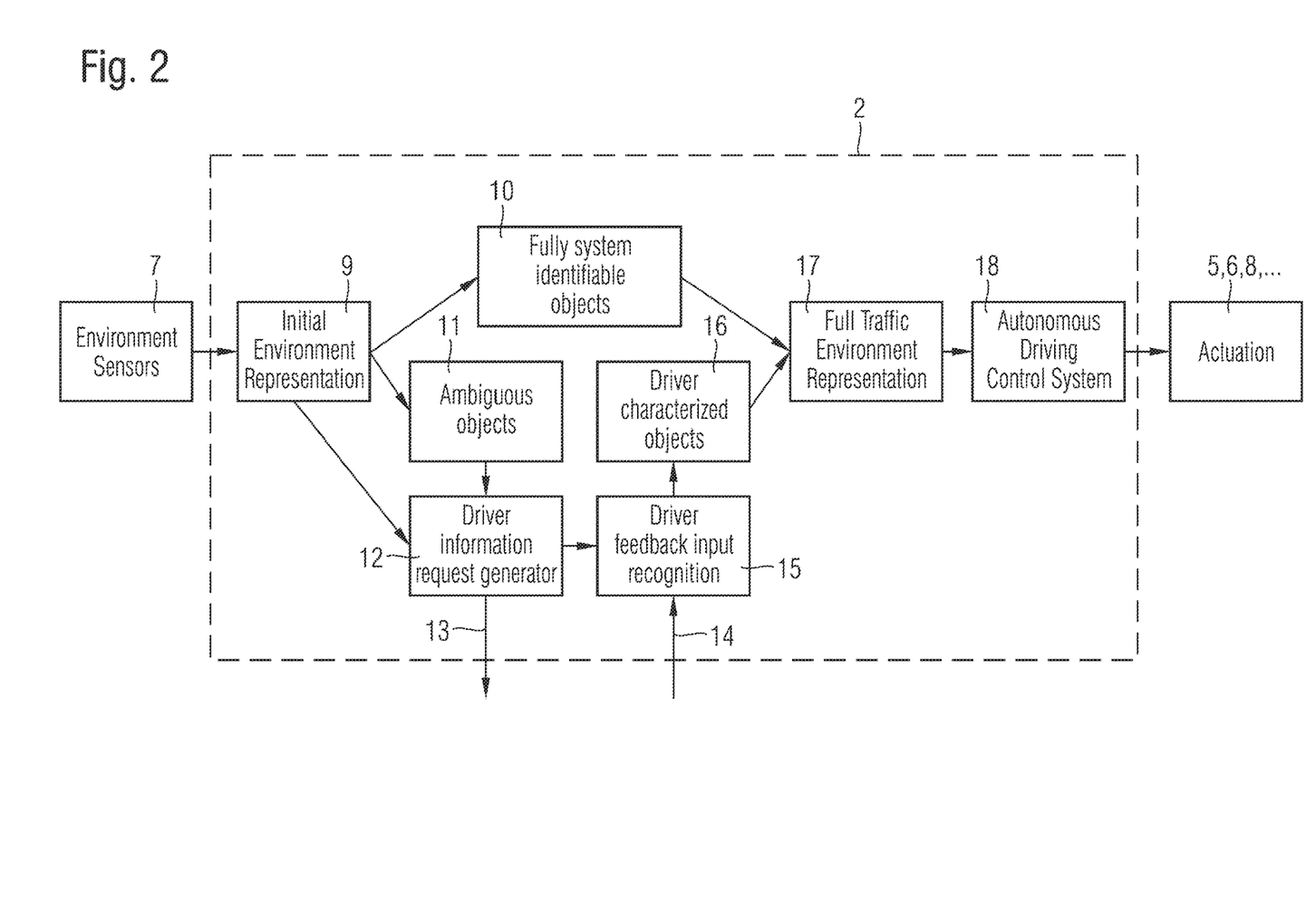
FIG. 2 a block diagram illustrating the functioning of the inventive system.

The functioning of the system, the method for executing the driving task will now be explained with reference to FIG. 2 which in more detail shows in particular the components of the central processing unit 2. Of course it is also possible to not have only a single central processing unit 2 but to perform the data processing by a plurality of distributed units which in sum cooperate as the central processing unit 2.

As already mentioned with respect to FIG. 1, the sensing means 7 comprising one or more environment sensors transmitting their signal to the central processing unit 2. As an output of the central processing unit 2, control signals are transferred to the respective actuators 5, 6, 8 . . . .

The central processing unit 2 is configured to generate an initial environment representation 9 on the basis of the signal received from the sensing means 7. In such initial environment representation 9, all the information that is perceived by the sensing means 7 in the environment of the vehicle 1 is accumulated. Thus, the representation 9 may be for example a 2D map or a 3D map with all the information on objects that can be perceived in the surrounding of the vehicle 1 added. Thus, the representation 9 comprises information on size, speed, type, or the like with respect to other traffic participants. Also infrastructure elements are included in the environment representation 9 such as traffic lights with their current status. Furthermore, information derived from maps and a global positioning system can be included in the environment representation 9. Thus, in the environment representation 9, all the information that is necessary for fulfilling a dedicated autonomous driving task are included.

It has to be distinguished between such objects for which all information is sufficiently clear and unambiguous like for example a traffic light which can be identified with a confidence above a predetermined threshold and for which also the current state (red light, green light, yellow light) can be determined with sufficient confidence. Sufficient confidence always means that the confidence is above a certain threshold. Of course, this threshold may be adapted for different situations.

Contrary to such objects, which are also called fully system identifiable objects, there may be objects perceived by sensing means 7 for which not all the information can be obtained that is necessary for later on use the object in determination of a traffic situation. One example could be that a pedestrian can be recognized by the system as an object in the environment of the vehicle 1, but it is not clear what the intention of such pedestrian is. For example, the pedestrian might intent to cross the road or might simply stand on the pavement without any intention to cross the road. If such intention or any other information on an object that might be relevant for the correct determination of the traffic situation cannot be obtained with sufficient reliability or confidence, or if no such information can be obtained at all on the basis of the signals received from the sensing means 7, such objects are classified as so-called ambiguous objects.

Thus, it is to be noted that according to the present invention, the system classifies all objects that are perceived by the sensing means 7 into either fully system identifiable objects or ambiguous objects. In case such ambiguous objects are recognized, the system according to the invention will start a communication with the driver of the vehicle 1. For starting such communication the communication means as mentioned already with respect to FIG. 1 are used. The communication means as a central element comprises a driver information request generator 12. In the driver information request generator 12, a request for information is generated which is then as indicated with arrow 13 is transferred to the speaker 8, for example. As mentioned earlier, it is not only possible to use a spoken output of the information request, but to use other communication channels, like visual or tactile channels.

The driver information request generator 12 in addition to the identified ambiguous objects also receives the environment representation 9. Having all the information at hand in the driver information request generator 12, it is possible to more clearly define the question that is directed to the driver. For example, the driver information request generator 12 has knowledge not only about the single ambiguous object for which additional information is needed, but also on its position relative to the vehicle or other traffic participants. Thus, a question may be more detailed, because the relative position of the object for which information is necessary can be identified. This has the effect that the driver does not need to analyze the situation by himself in order to derive in a first step knowledge to which object the question is directed.

In response to the question that was output by the inventive system, for example as a spoken question, the driver will answer, which is in the vehicle 1 according to FIG. 1 performed by a spoken answer received by microphone 9a. The respective signals are, as indicated by arrow 14, input into the central processing unit 2 and in particular to a driver feedback input recognition unit 15. In the driver feedback input recognition unit 15, the response of the driver is analyzed and information is extracted from the spoken response or the input via a touch screen or the like. The information that can be extracted from the response is added as information on the previously ambiguous object and thus the ambiguity can be overcome. Thus, the enhanced information is now used to generate from the initial environment representation 9 and having added the additional information a full traffic environment representation. This is again performed in the central processing unit 2 or its environment representation generator. Thus, in the embodiment as described with respect to FIG. 2, there is a two-step generation of the environment representation 17 in case that not for all the objects identified a sufficient and satisfying information on the object can be derived on the basis of the sensing means 7. In that case, at first an initial environment representation 9 is generated and then for the identified ambiguities additional information is requested from the driver, which is then added to the environment representation to achieve an enhanced environment representation or full traffic environment representation 17. This full traffic environment representation 17 comprises the accumulated information that is derived from the sensor signals as well as answered questions.

The full traffic environment representation 17 may also correspond to the initial environment representation 9 in case that no ambiguous objects can be identified after generating the initial environment representation 9. In that case, of course, no information can be added, because the identification of any ambiguous objects is a prerequisite for starting the communication with the driver in order to enhance the environment representation.

The full traffic environment representation 17 is then used to execute the autonomous driving of vehicle 1. The autonomous driving control system as indicated by reference numeral 18 per se is known from the prior art and also the use of representations of the environment in order to determine a traffic situation and on the basis of the determined traffic situation decide on actions that need to be taken by the vehicle 1. Such actions may be for example braking, accelerating, changing the direction of driving to the right or left or the like. The autonomous driving control system 18 on the basis of the full traffic environment representation generates control commands, which are then transmitted to the respective actuators 5, 6, 8, . . . .

It is to be noted that in addition to the signals from the sensing means 7, also signals that may be received from intelligent transportation system infrastructure or vehicles equipped with such means may be used. This is not illustrated in FIG. 2, but adding such information to the initial environment representation may easily be done. Furthermore it is to be noted that it is not necessary that for all ambiguous objects information is requested from the driver. It may be more efficient that at first it is determined to consider which of the objects in fact have an influence on the traffic situation that currently needs to be handled by the autonomous driving system. For example driving on a highway typically needs information about velocities, positions and sizes of other vehicles in combination with lane information. If all this information is unambiguously available for the system, it is sufficient to perform safe adaptive cruise control. If in such case other objects are perceived by the environment sensors, but these objects do not seem to influence the traffic situation so that they do not affect the control of the car, no communication with the driver will be started preferably, even if these are to be considered ambiguous.

In order to have an efficient communication between the driver and the inventive system, it is preferred that the system has a proper model of the driver's current interpretation of the situation. This means that in particular the intention of the driver, the focus of his attention regarding the environment, and the current assumptions of the driver regarding the autonomous control system should be taken into consideration. Such consideration allows a more efficient generation of the information request. This means that the content of the information request may be adapted to the state of the driver. In particular the current assumption of the driver has a strong influence on the complexity of the information request and thus has a great influence, if the request and response may even be available in short time. In case that a driving task or a sub-task like observation of a particular area just was delegated by the driver to the system, a question may be for example obvious to the driver and no further information has to be given.

But if a more general driving task like for example fully autonomous driving on a highway was initiated already a long time ago and then an ambiguous object arises, the driver might not be aware that the request from the system is in relation to this driving task. In that case it might be helpful, if the system enriches the question with additional information what driving task is currently the source or motivation for the question. For example after a longer time of autonomous highway driving, the system may need some information on another vehicle for safe overtaking. In that case the system may ask the driver "As we want to overtake, will this car pull out?" in that case at first the driver is informed about the action that is currently considered and then the question itself about a particular object like a preceding car is asked. Another example would be an intersection scenario where the driver just initiated the autonomous maneuver "Please turn right". In that case the driver expects that only pedestrians on the right side are relevant and if then the system may ask "Will the pedestrian cross?" the driver will automatically focus his attention to a person on the right side. This is even sufficient if there are several other pedestrians in the scene, which are, however, irrelevant for the current autonomous maneuver.

Figure 3:
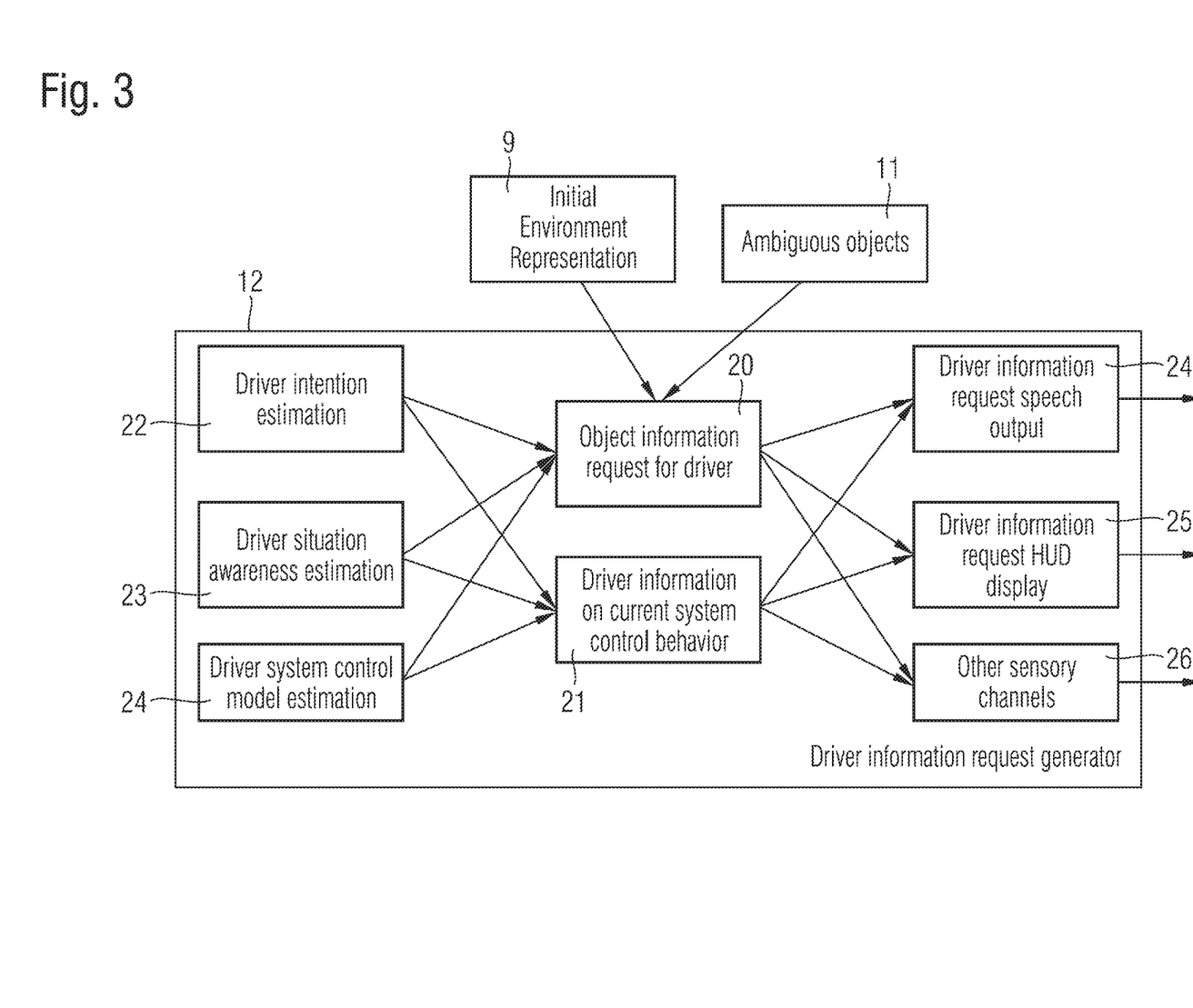
FIG. 3 a more detailed block diagram for explaining a driver information request generator of the system.

A more detailed illustration of the driver information request generation 12 is shown in FIG. 3. The driver information request generator comprises two sub units. On the one hand the request generator unit 12 for obtaining information on ambiguous objects 20. As already explained with respect to FIG. 2 the ambiguous objects are identified in the initial environment representation 9. On the basis of this information requests to obtain additional information are output to the driver. On the other side a request generator unit 21 regards additional information for the driver. This unit 21 is concerned with giving information when the driver might not be capable of determining to what object the question is directed otherwise.

As indicated earlier the manner for generating the request by the communication means can be adapted in response to knowledge about a driver intention, a driver situation awareness and a driver system control model. For estimating the driver's intention a driver intention estimation unit 22 is part of the driver information request generator 12. This driver intention estimation unit 22 maintains an estimate of the current driver intention with respect to the autonomous maneuver or the partially autonomous maneuver. In case of full autonomous driving with low or absent driver involvement there may be no intention estimate possible. On the other side if the driver initiated a partially autonomous maneuver like single turn and observation of an intersection the intention may be quite certain. In the given example it is completely clear that the driver wants to turn right, because this corresponds to the immediately previously given instructions. This estimate can be used to create an optimal information request that takes the driver intention into account. Thus, the question which is directed to the driver will be short and clear but nevertheless no ambiguity on the driver's side can arise.

The driver situation awareness estimation unit 23 creates a model of the current scene awareness of the driver. Thus, it is determined what parts of the scene are currently attended by the driver. The determination can be made for example on the basis of an image signal of an inside vehicle camera that captures images of the driver while driving. Thus, it is possible to determine from the image signal a direction or other driver behavior parameters. Such determination of what the driver currently is focused on is known in the prior art but with respect to the invention it is important that this information is used in order to adapt the generation of the information request. To give an example, this means that if the intention of the driver is already focused on the relevant object it is not necessary to repeat information for an improved identification of the object. The information request can be less explicit thus shortening the request itself. If a pedestrian is standing next to the drive lane and from the gaze direction determined for the driver it is clear that the driver already watches the pedestrian it is sufficient to reduce the information request to for example: "Will he cross the lane?".

Furthermore, an estimation unit 24 is directed at estimating a driver system control model. This estimation unit 24 thus estimates the current model that the driver uses for understanding the ongoing autonomous vehicle control or partially autonomous vehicle control. The model the driver uses for understanding the autonomous vehicle control may for example be influenced by the time at which the autonomous vehicle control was started. If it was started only recently the driver will be aware of the model that has to be used in the current situation for generating the control signals for autonomously driving. As a consequence the driver will also be aware of the objects that are to be determined in order to safely execute autonomous vehicle control for a current autonomous maneuver. Again in case that it is clear that the driver at the moment has a proper understanding of the model that is used for autonomous driving at the moment the information request can be shortened and some information may be omitted without becoming ambiguous. On the other side this means that if the current control might be unclear to the driver the information request is enriched. Such enriched information request may have added an explanation of the current autonomous control behavior. An example is "to overtake, I need to know if this car will pull out" or "for us turning left, will the cyclist give way?" or "for keeping headway, is this a dangerous car?". Thus, the estimation of the knowledge of the driver about the currently used model for the autonomous driving will be taken into consideration. For example, where the car, while autonomously driving, decides that overtaking would be the right measure it is therefore needed to explain to the driver that the requested information regards such overtaking, because there is an alternative behavior available such as staying behind the predecessor.

On the basis of the estimation results of units 22, 23 and 24, the information request generator unit 20 assembles an optimal information request. The same is true for the information request generator unit 21, which assembles the information given to the driver to ensure his correct understanding of the question.

As previously mentioned, there are several possibilities to output the information request. At first, a speech output unit 24 may be used to generate a spoken question. That means a synthesized speech output is generated on the basis of the information request generator unit 20 and the information request generator unit 21.

By use of the head-up display 25, it is for example possible to highlight an object for which information needs to be obtained. Finally, other sensory channels 26 may be available for communication the request to the driver. Examples are tones (auditory), dashboard displays (visual or haptic displays).

Figure 4:
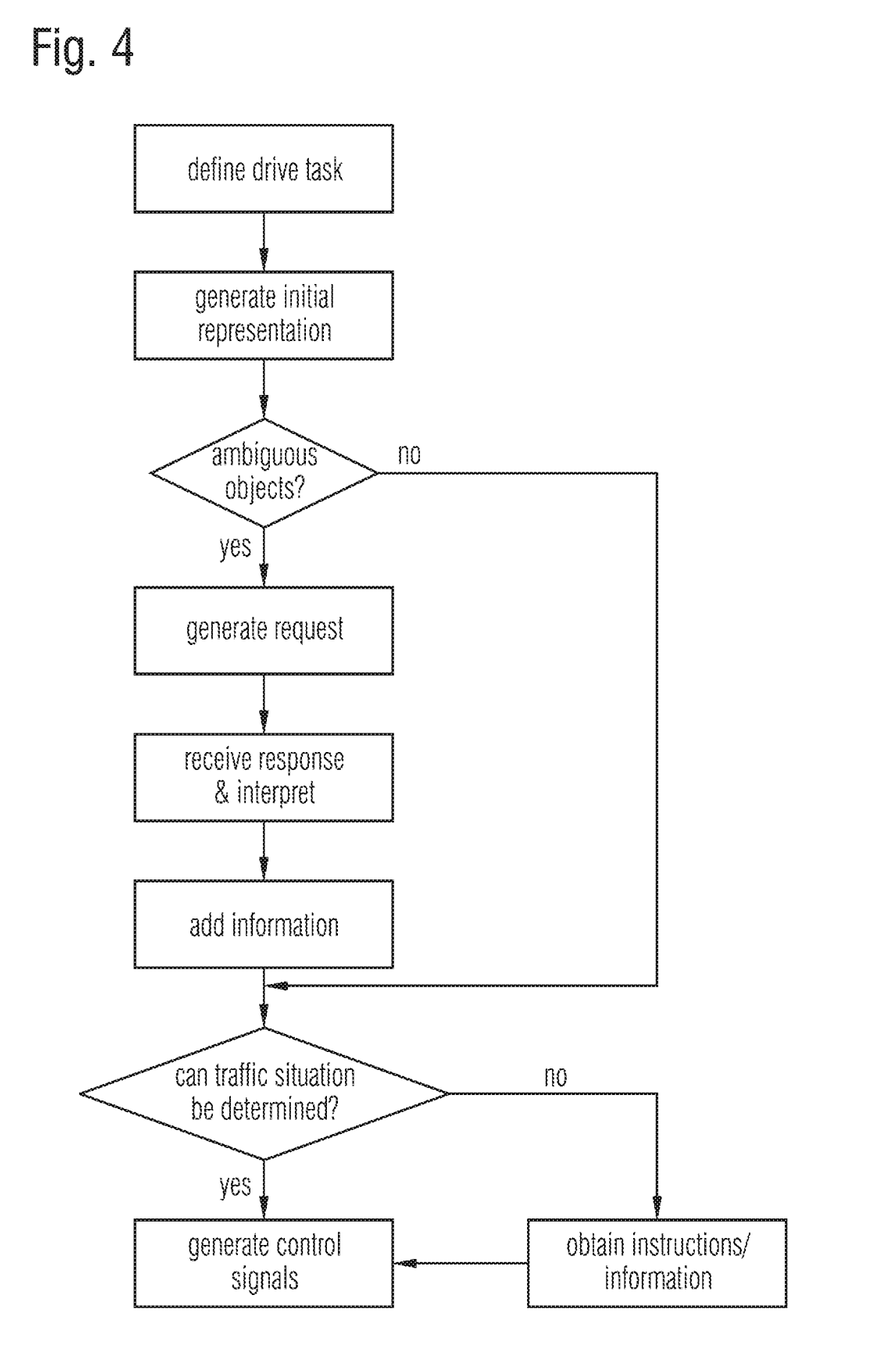
FIG. 4 a simplified flow chart for explanation of the method for executing autonomously or partially autonomously driving according to the invention.

FIG. 4 shows a simplified flowchart of the method for executing autonomous driving of a vehicle. At first, the driving task is defined. By defining such driving task, different levels of autonomy of the system can be established. An example for partial autonomous control is delegating only a subtask of the driving task to the assistant system. As mentioned above, this means that for example the control of the behavior of the car finally is performed by the driver, but observation of a particular area is delegated to the system. One example is that the driver asks the car to "watch out on the right side". Thus, by this drive task only supervision of the right side of the car based on the internal sensors like radar, vision, lidar or infrared time of light sensors is performed. If, while executing this subtask, the system recognizes that some traffic element cannot reliably distinguished or interpreted the communication with the driver is started as it is explained above.

Autonomous control can also be limited to a certain maneuver of the car. For example, the car can be instructed to perform a turn at a busy and complex inner city intersection. In order to initiate this specific maneuver, a spoken command may be used by the driver. For example "please turn right at the next intersection" limits the autonomous control of the vehicle to only turning right at the next intersection, but the way to the next intersection and the further driving of the car is fully under control of the driver. The car will then approach the intersection and examine the perceived traffic participants. If it is determined or if the car detects a participant, where it cannot reliably decide, what he or she will do, then again the communication with the driver is started. Thus, in the above-described manner an information request is generated and thus the driver is asked for giving his judgment. Thus, when finally determining the traffic situation, the additional information on this particular pedestrian is included into the judgment of the system how to perform the turn. The other dynamic traffic participants, for which no ambiguity in interpretation can be recognized, will be tracked by the autonomous perception system anyway and thus a safe turn is ensured.

Finally, the highest level is fully autonomous driving for a longer period. This can be for example the case on a highway route. In such a case when the autonomous control system encounters a situation where it is not able to obtain a confidence situation estimation or deducts a mismatch between internal prediction and actual situation development, an information request to the driver is generated. Taking into consideration this additional information from the driver, the system then can disambiguate the situation.

In the next step according to FIG. 4, an environment representation is generated on the basis of the already available information from the sensing means 7. In this environment representation it is determined if the information available for the objects in the representation is already sufficient or if there is any ambiguity or entirely missing information.

If such ambiguous objects are identified the communication with the driver of the vehicle 1 is started. An information request is generated which is adapted on information about the driver's awareness, the driver's control model and the driver's intention and output to the driver. The system waits until in the next step a response from the driver is received and interpreted by the system. The relevant information is extracted from the driver's response or feedback and is added to the environment representation map.

On the basis of the environment representation the system then determines a traffic situation and decides on measures to be taken in order to fulfill the driving task. Such measures can be acceleration or deceleration, changing driving direction of the vehicle or the like.

If the system furthermore comes to the conclusion that no safe control measure can be determined by the system on itself, it is also possible to start the communication with the driver to obtain information to disambiguate the situation or to receive clear instructions on how to proceed with driving.

With the inventive system it is possible to increase the use of autonomous or partially autonomous driving systems since more information about the environment can be used as a basis for the autonomous control but also in case that the system itself is not able to safely decide on a control measure it is possible to even use clear instructions from the driver on how to solve the current traffic situation. Examples for the use of such systems are:

The car reaches an intersection and plans to turn. The system elements cannot be reliably distinguished or interpreted. For example a pedestrian is standing close to the street with unclear intention whether to cross the street or not, or the state of the traffic light cannot be determined because of unfavorable illumination conditions. In such a case the control system will inform the driver of the situation and ask for his assistance. In his response the driver then gives the information to support the perception of the traffic participant or gives driving instructions on how the system shall proceed with driving the vehicle autonomously. That means that after communicating with the pedestrian in such a way that the driver himself is able to clearly decide on the intention of the pedestrian, he might instruct the system to continue turning. Such information about the intention of a pedestrian often can be made easily by a human driver in situations where the system cannot reliably decide on a particular behavior. Alternatively the driver of course may also take over the driving task in this situation.

Another example is a car driving fully autonomously for a longer period like for example on a highway route. If during such autonomously driving this control system encounters a situation where it is not able to obtain a confident situation estimation or even a mismatch between an internal prediction of the traffic development and the actual situation development. In that case the system may ask the driver to provide some more information that will allow the system to disambiguate the situation. If for example on a highway there is a construction zone and the vehicle approaches such construction zone, it might happen that the system cannot reliably recognize such construction zone and take it into consideration for generating the control commands. By communicating with the driver the system then can obtain the information if in fact the uncertain area that is observed by the sensing means 7 is an upcoming construction zone or not. If the system then receives the information "yes it is a construction zone", the system can for example automatically adapt the speed and consider the border of the construction zone as lane marking instead of the painted lane markings.

Another example again concerns fully autonomously driving for a longer period. If at one point the vehicle's lane ends and at the same time there is a congestion on the neighboring lane, the system cannot fulfill its driving task on its own, because a lane change on the congested lane seems to be impossible due to small gaps between the cars. In such a case the driver is motivated by the system by a respective information request to communicate with the other traffic participants and negotiate a gap to them. The driver will then if he negotiated such gap, give a response to the system indicting that there is a gap available and thus the system may understand that the gap even if currently considered too small is sufficient for performing the lane change. This can be made because the driver negotiated such gap and thus can be sure that the gap will be enlarged by the other traffic participant actively so that the vehicle can change the lane. Having knowledge about such gap to be generated, the system then can autonomously perform the lane change.

The last example again concerns the fully autonomously driving for a longer period on a highway route. It might be the case that a contradiction between traffic rules and the real traffic situation occurs. For example an obstacle blocks the current drive lane of the vehicle but at the same time no overtaking road markings or signs are present. In that case the communication means informs the driver about this contradiction and invites to give instructions how to overcome the problem. As a response the driver will then instruct the system accordingly, for example to change lane despite of the no overtaking markings or signs.

The invention claimed is:

1. A system for autonomously or partially autonomously driving a vehicle, the system comprising:
   at least one sensor for physically sensing an environment of the vehicle;
   a representation generation device for generating an initial representation of the environment, wherein the initial representation represents objects and other information on the environment of the vehicle by accumulating information on the objects in the environment derived from output of the sensor and the representation generation device is configured to classify the objects in the initial representation into either identifiable objects or ambiguous objects, for which no information or information with a confidence below a predetermined threshold is derivable from the sensor output and to determine which of the ambiguous objects have an influence on a traffic situation that currently needs to be evaluated;
   a communication device for obtaining, from a vehicle's driver, additional information on at least one determined ambiguous object, wherein the representation generation device is configured to generate an enhanced environment representation by adding the additional information on the at least one object to the initial environment representation; and
   an evaluation device for evaluating the current traffic situation based on the enhanced environment representation, and for generating control signals for controlling the vehicle like steering, throttle or brakes to achieve a control task based on the evaluated current traffic situation.

2. The system according to claim 1, wherein
   the evaluation means is configured to determine, whether or not the control signals to achieve the control task can be generated based on the determined current traffic situation; and the communication device is configured to obtain, from the vehicle's driver, information how the control task shall be realized, if for the determined current traffic situation no control signals for controlling the vehicle that are suitable to achieve the control task can be generated.

3. The system according to claim 1, wherein the system comprises a driver's state estimation device.

4. The system according to claim 3, wherein the communication device is adapted to communicate with the driver on the basis of the driver's state.

5. A system for autonomously or partially autonomously driving a vehicle, the system comprising:
at least one sensor for physically sensing an environment of the vehicle;
a representation generation device for generating an initial representation of the environment, wherein the initial representation represents objects and other information on the environment of the vehicle, by accumulating information on the objects in the environment derived from output of the sensor, wherein the representation generation device is configured to classify the objects in the initial representation into either identifiable objects or ambiguous objects, for which no information or information with a confidence below a predetermined threshold is derivable from the sensor output and to determine which of the ambiguous objects have an influence on a traffic situation that currently needs to be evaluated;
a communication device for obtaining, from a driver of the vehicle, additional information on at least one determined ambiguous object, wherein the representation generation device is configured to generate an enhanced environment representation by adding the additional information on the at least one object to the initial environment representation, and
an evaluation device for evaluating the current traffic situation based on the enhanced environment representation, and for generating control signals for controlling the vehicle like steering, throttle or brakes to achieve a control task based on the evaluated current traffic situation, wherein
the communication device comprises a driver information request generator for generating and outputting a request to the driver to obtain the additional information,
the information request generator comprises at least one of the following: a driver intention estimation device configured to estimate intention of the driver with respect to an autonomous maneuver or a partially autonomous maneuver, a driver situation awareness estimation device configured to estimate current traffic situation awareness of the driver, and a driver system control model estimation device configured to estimate a model that the driver uses for understanding the ongoing autonomous vehicle control or partially autonomous vehicle control, and
the amount of information given in the request to the driver or a manner of presentation of such information is adapted based on an estimation result of at least one of the driver intention estimation device, the driver situation awareness estimation device, and the driver system control model estimation device.

6. The system according to claim 1, wherein the communication device is configured to request the driver to communicate with another traffic participant.

7. The system according to claim 1, wherein the communication device inputs and/or outputs speech for communication with the driver.

8. The system according to claim 1, wherein the communication device is a head up display used for communication with the driver.

9. A method for autonomously or partially autonomously driving a vehicle, comprising the steps of:
sensing, by at least one sensor, an environment of the vehicle;
generating, by a controlling device, an initial representation of the environment, wherein the initial representation represents objects and other information on the environment of the vehicle, by accumulating information on the objects in the environment derived from output of the sensor, and the objects in the initial representation are classified into either identifiable objects or ambiguous objects, for which no information or information with a confidence below a predetermined threshold is derivable from the sensor output and, from the ambiguous objects, objects which have an influence on a traffic situation that currently needs to be evaluated are determined;
obtaining, from a vehicle's driver, additional information on at least one determined ambiguous object;
generating, by the controlling device, an enhanced environment representation by adding the additional information on the at least one object to the initial environment representation;
evaluating, by the controlling device, the current traffic situation based on the enhanced environment representation; and
generating, by the controlling device, control signals for controlling the vehicle like steering, throttle or brakes to achieve a control task based on the evaluated current traffic situation.

10. A method for autonomously or partially autonomously driving a vehicle, the method comprising the steps of:
sensing, by at least one sensor, an environment of the vehicle;
generating, by a controlling device, an initial representation of the environment, which represents objects and other information on the environment of the vehicle, by accumulating information on objects in the environment derived from output of the sensor, wherein the objects in the initial representation are classified into either identifiable objects or ambiguous objects, for which no information or information with a confidence below a predetermined threshold is derivable from the sensor output and, from the ambiguous objects, objects which have an influence on a traffic situation that currently needs to be evaluated are determined;
generating, by the controlling device, a request to a vehicle's driver to obtain additional information on at least one determined ambiguous object by estimating at least one of the following: intention of the driver with respect to an autonomous maneuver or a partially autonomous maneuver, a current traffic situation awareness of the driver and a model that the driver uses for understanding the ongoing autonomous vehicle control or partially autonomous vehicle control, wherein the amount of information given in the request to the driver or a manner of presentation of such information is adapted based on a result of the estimation;
outputting the generate request to the driver;
obtaining, from the driver, the additional information on at least one determined ambiguous object;

generating, by the controlling device, an enhanced environment representation by adding the additional information on the at least one object to the initial environment representation;
evaluating, by the controlling device, the current traffic situation based on the enhanced environment representation; and
generating, by the controlling device, control signals for controlling the vehicle like steering, throttle or brakes to achieve a control task based on the evaluated current traffic situation.

* * * * *